(12) United States Patent
Kaufmann et al.

(10) Patent No.: US 11,040,291 B2
(45) Date of Patent: Jun. 22, 2021

(54) MOTION PICTURE PRESENTATION DEVICE

(71) Applicant: simtec Systems GmbH, Braunschweig (DE)

(72) Inventors: Bernd Kaufmann, Braunschweig (DE); Anne Lena Kaufmann, Braunschweig (DE)

(73) Assignee: SIMTEC SYSTEMS GMBH, Braunschweig (DE)

( * ) Notice: Subject to any disclaimer, the term of this patent is extended or adjusted under 35 U.S.C. 154(b) by 0 days.

(21) Appl. No.: 16/789,925

(22) Filed: Feb. 13, 2020

(65) Prior Publication Data

US 2021/0072631 A1    Mar. 11, 2021

(30) Foreign Application Priority Data

Sep. 5, 2019  (EP) ..................... 19195744

(51) Int. Cl.
*A63G 31/16* (2006.01)
*A63J 25/00* (2009.01)
*A63G 31/02* (2006.01)

(52) U.S. Cl.
CPC ............. *A63G 31/16* (2013.01); *A63G 31/02* (2013.01); *A63J 25/00* (2013.01)

(58) Field of Classification Search
CPC ........ A63G 31/00; A63G 31/02; A63G 31/16; G09B 9/00; G09B 9/12; A63J 25/00
USPC ............ 472/59–61, 130; 434/29, 55; 52/6, 8
See application file for complete search history.

(56) References Cited

U.S. PATENT DOCUMENTS

| | | | |
|---|---|---|---|
| 9,943,773 B2 * | 4/2018 | Li | A63G 31/02 |
| 10,366,625 B1 * | 7/2019 | Tang | B64D 11/06 |
| 2009/0253524 A1 * | 10/2009 | Bonfiglioli | A63G 1/10 472/30 |
| 2015/0273348 A1 * | 10/2015 | Job | E04H 3/30 472/59 |
| 2016/0271503 A1 * | 9/2016 | De-Gol | A63J 25/00 |

FOREIGN PATENT DOCUMENTS

DE    10 2011 122 229 A1    6/2013

* cited by examiner

*Primary Examiner* — Kien T Nguyen
(74) *Attorney, Agent, or Firm* — W&C IP

(57) ABSTRACT

A motion picture presentation device with at least one motion picture display device, a multitude of seats for viewers and a movement device are configured with at least five linear drives. With the linear drives, the seats can be collectively moved in at least five degrees of freedom. At least one linear drive is fixed to a swivelling arm. At least two linear drives are immovably fixed at a respective base point, and a base element to which the seats are fixed such that they can be swivelled. The arrangement can be brought out of a first docking position, in which the base element can be docked at an access point, into a presentation position, in which the base element is swivelled by a swivel angle of at least 15° in relation to its first position, by activating the movement device. The base element can be brought from the docking position into the presentation position by swivelling the arm upwards.

15 Claims, 5 Drawing Sheets

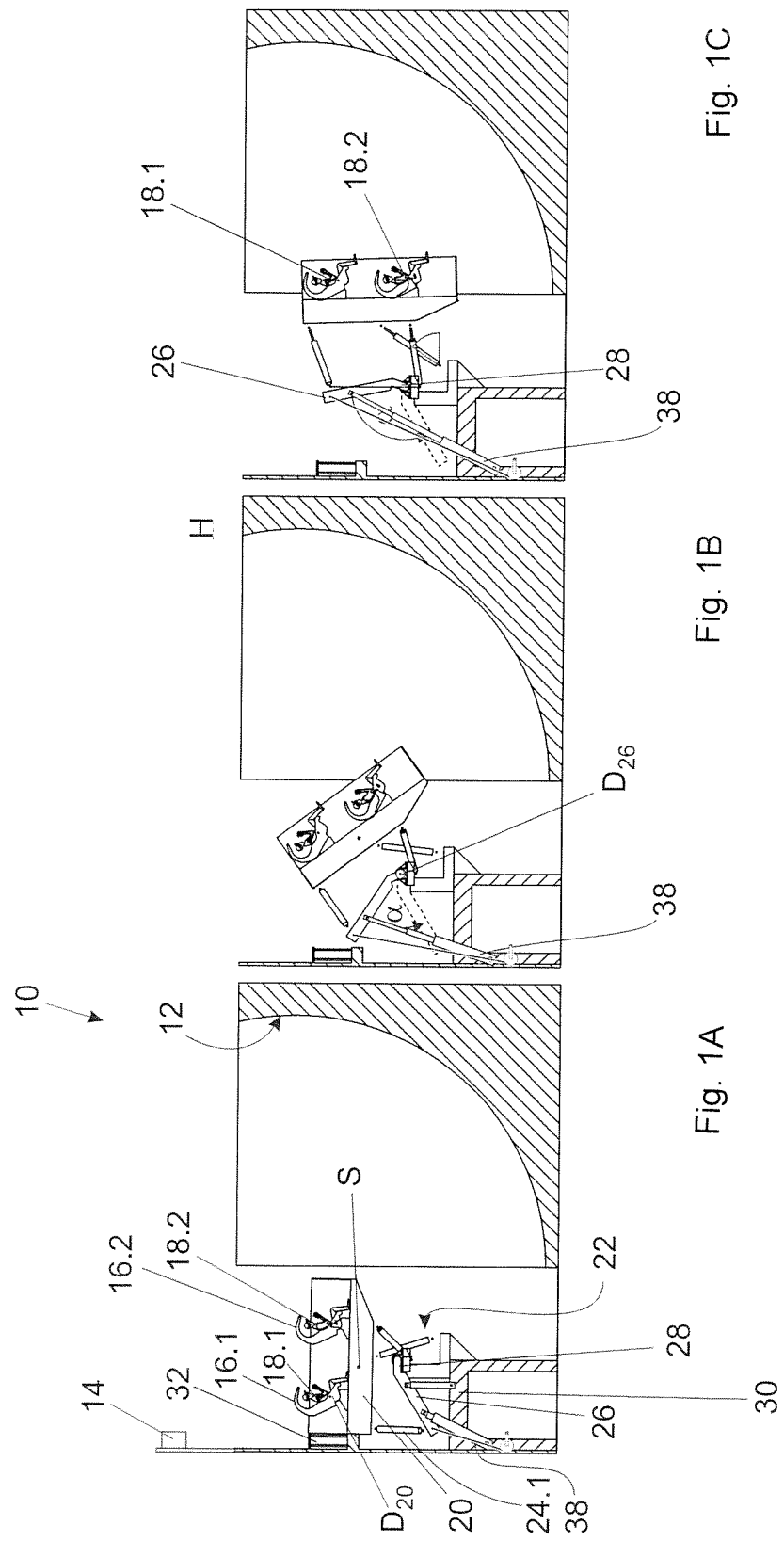

MOTION PICTURE PRESENTATION DEVICE

Figure 2A:
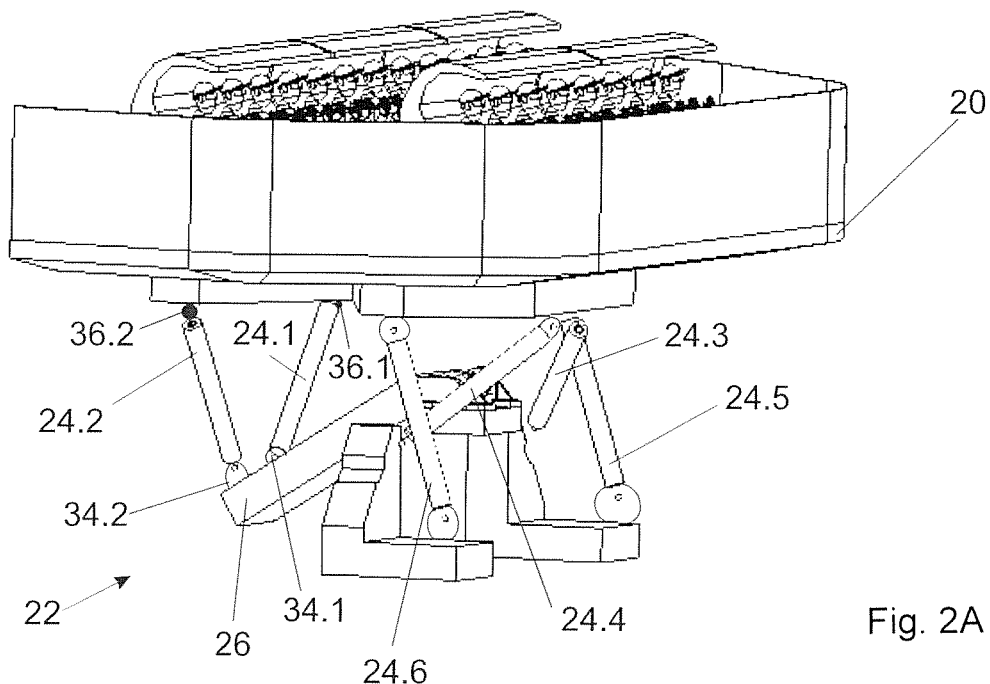

The invention relates to a motion picture presentation device with (a) at least one motion picture display device, (b) a multitude of seats for viewers and (c) a movement device, which comprises at least five linear drives, by means of which the seats can be collectively moved in at least five degrees of freedom, wherein at least one linear drive is fixed to a swivelling arm and wherein at least two linear drives are immovably fixed at a respective base point, and (d) a base element to which the seats are fixed such that they can be swivelled and which can be brought out of a first docking position, in which the base element can be docked at an access point, into a presentation position, in which the base element is swivelled by a swivel angle of at least 15° in relation to its first position, by activating the movement device.

Such a motion picture presentation device is known from DE 10 2011 122 229 A1 and provides an easy way to move the viewers into a position in which they can view the motion picture particularly comfortably. The functionality of this system has been proven effective, yet it remains a disadvantage that its construction, installation and/or maintenance may be relatively complex.

The invention aims to reduce disadvantages of the prior art.

The invention solves the problem by way of a motion picture presentation device according to the preamble, the base element of which can be brought from the docking position into the presentation position by swivelling the arm upwards.

The invention also solves the problem by way of a viewer module for such a motion picture presentation device with (a) a multitude of seats for viewers and (b) a movement device, (i) which comprises at least five linear drives, by means of which the seats can be collectively moved in at least five degrees of freedom, (ii) wherein at least one linear drive is fixed to a swivelling arm and (iii) wherein at least two linear drives are immovably fixed at a respective base point, and (c) a base element (i) to which the seats are fixed such that they can be swivelled and (ii) which can be brought out of a first docking position, in which the base element can be docked at an access point, into a presentation position, in which the base element is swivelled by a swivel angle of at least 15° in relation to its first position, by activating the movement device, wherein the base element can be brought from the docking position into the presentation position by swivelling the arm upwards.

According to a further aspect, the invention solves the problem by way of a method for presenting a motion picture by means of a motion picture presentation device that comprises (a) at least one motion picture display device and (b) a viewer module according to the invention with the steps: activating the movement device by swivelling the arm upwards so that the base element is brought (i) out of a first docking position, in which the base element is docked at the access point, (ii) into a presentation position, in which the base element is swivelled by a swivel angle of at least 15° in relation to its first position.

The advantage of the invention is that each viewer can be moved in such a way that it creates the realistic illusion that each viewer is experiencing what is happening in the motion picture for themselves; this is particularly true if the linear drives form a hexapod drive, which is the case according to a preferred embodiment of the invention.

It is also advantageous that the movement device can be constructed more simply than previous solutions. As such, the swivelling arm causes the movement of the viewers' seats to a large extent simply by moving the swivelling arm so as to move them out of the docking position, in which the viewers can take their seats, into a presentation position, in which they are able to watch the motion picture. Unlike solutions from the prior art, which stipulate that the hexapod drive be fully fixed to a swing arm, the arm need not bear all forces and torques; rather, it only has to bear those forces and torques that are exerted by the linear drives that are fixed to the swivelling arm. The other forces can be guided via the base points of the respective linear drives directly into a construction to which the movement device is fixed. Furthermore, the demands on this construction are lower, as the forces that are to be introduced locally are generally smaller than in known systems. It is beneficial for the linear drives to be arranged in such a way that the forces transmitted via the swivelling arm are smaller than the forces that are not transmitted via the swivelling arm. Preferably, the forces that are transmitted via the swivelling arm are as small as possible.

According to a preferred embodiment, the motion picture display device features (a) at least one projection screen and (b) at least one projector, which is configured to project a motion picture onto the projection screen. Such a system is often easy to scale and in general comparatively easy to produce.

Alternatively or additionally, the motion picture display device may have an LED screen or another type of self-luminous screen. This LED screen may be curved, especially spherically; however, this is not necessary.

Within the scope of the present description, the projection surface should be understood particularly to mean a flat or curved surface that is light, for example white, thereby allowing the motion picture to be projected onto the projection screen.

The projector should be understood particularly to mean a device by means of which a rapid sequence of at least 15 different images per second (motion picture) can be projected onto the projection surface. It is possible for the projector to be made up of several individual projectors which light up different parts of the projection surface. This type of projector, which is composed of several individual projectors, is used as standard equipment in 3D cinemas.

It is possible and practical to design the motion picture presentation device so that it can accommodate at least 4, especially at least 12, preferably at least 20, viewers. In other words, it is beneficial for there to be at least 4, but particularly at least 20, seats available for viewers. The motion picture presentation device is preferably designed to accommodate a maximum of 120 viewers.

The motion picture should be understood to mean a sequence of images that is predefined, as is the case with a classic cinema motion picture. Alternatively, it is possible for the motion picture to be determined interactively. In this way, the motion picture presentation device may be a flight simulator. The motion picture presentation device preferably has a processing unit which is coupled with a control device. If the control device is activated, the processing unit calculates the reaction that an aircraft would exhibit in the event of a corresponding activation of a control device and calculates images projected by the projector onto the projection surface as well as control signals for the movement device. The viewers on the seats then have the feeling that they are sitting in an aircraft controlled by the control device. Instead of simulating an aeroplane, it is also possible to simulate any other kind of aircraft, for example flying objects like helicopters, gyrocopters, rockets or cars, such as a virtual car on a virtual road, or ships.

In the docking position, the base element may be docked directly at an exit, for instance. The exit is preferably an immovable part of a construction. This results in a system that requires little installation space. Such a construction with a motion picture presentation device according to the invention is a further subject of the invention.

Alternatively, when in the docking position, the base element may be docked at a docking station, which forms part of the motion picture presentation device according to a preferred embodiment of the invention. Preferably, the docking station can be moved away from the base element. The advantage of this is that the envelope of movement is free and the movement can be conducted in preferably all degrees of freedom from the docking position.

The motion picture presentation device is preferably designed to present the motion picture in a feedback-free manner. In other words, the motion picture and the movement of the viewers' seats is executed using a pre-determined sequence of images and movements. In other words, the motion picture presentation device is preferably not a simulator. With a simulator, the image shown depends on an input from a person who is generally trained by means of the simulator. The production of such simulators is very complex and therefore expensive. They are therefore not generally well-suited for entertaining a number of people.

The feature that the seats can be collectively moved in at least five degrees of freedom should be understood especially to mean that the seats are coupled relative to one another in terms of at least five degrees of freedom. For instance, the seats are coupled with one another in terms of the three degrees of translational freedom. This applies particularly if all the seats are attached to a base element. If this base element moves translationally in a spatial direction, all the seats move by the same amount in the same direction.

It is beneficial if the seats are mounted such that they can be swivelled about at least one seat-swivel axis. The swivelling arm is mounted such that it can be swivelled about an arm swivel axis. It is especially advantageous if the at least one seat-swivel axis runs at least predominantly parallel to at least one arm-swivel axis.

The feature that the swivel axes run predominately parallel to one another should be understood to mean that it is possible for the swivel axes to run parallel to one another, but that it is also possible for both swivel axes to form an angle together that is smaller than 10°, for example. The advantage of this situation is that the swing arm can be activated and the seats can conduct a counter-movement that causes the seat to not experience any rotational acceleration.

According to the invention, the motion picture presentation device has an access point by means of which viewers can reach the seats, wherein the movement device comprises a base element to which the seats are attached such that they can be swivelled. This results in an especially simple construction.

It is advantageous if the movement device can be brought into a docking position, in which the base element is docked at the access point, and into a presentation position, in which the base element is inclined by a swivel angle of at least 15° relative to its first position, by activating the swivelling arm. In the second position, the base element is generally positioned further away from the access point than in the first position. From this position, a multitude of movements can then be conducted with the movement device, which preferably forms a hexapod drive.

The docking position can be described as a neutral position which allows for a change in viewer. The presentation position can be described as a working position in which the viewers can watch the motion picture and be moved.

The seats are preferably arranged on the base element such that, when the movement device is in the docking position, at least one third of the people sitting on the seats have at least one seat in their field of vision; when the movement device is in the presentation position, this becomes a maximum of one tenth of the people sitting on the seats. The field of vision should be understood especially to mean the binocular human field of vision with a horizontal range of ±10°, a positive upward vertical range of +25° and a negative downward vertical range of −35°.

The field of vision, which could be defined as a field of focus, defines the areas which keep up with all viewed objects in the exterior space on which the eye can direct a consecutive central focus. If, when in the presentation position, a maximum of one tenth of the people—in particular small people—sitting on the seats have one other seat in their field of vision, the person has the impression that they are completely alone in the room, which creates an especially intense experience.

It is beneficial if the base element can be swivelled solely by means of the swivelling arm by at least 20°, in particular by at least 30°.

The base element can preferably be swivelled by means of the hexapod drive relative to a swivel movement about the arm-swivel axis by at least 25°, in particular by at least 30°. It is also beneficial if the base element can be swivelled by means of both the arm and the hexapod drive by at least 60°, in particular by at least 70°. It has been proven that 90°±25° is particularly favourable. The base element can preferably be swivelled by means of the arm and the hexapod drive together by a maximum of 180°.

According to a preferred embodiment, the hexapod drive comprises at least six linear drives, wherein each linear drive has a minimum length position, a maximum length position and a hub, wherein at least one linear drive has moved at most 75% of its hub out of the minimum length position when the movement device is in the first position. In the docking position, at least five, but especially six, linear drives are preferably retracted by at least 75%. The swivelling arm and its swivel drive are then preferably in their end positions.

A linear drive should be understood particularly to mean a drive that can generate a compressive force and a tensile force. The linear drive may also be a telescopic drive and be configured to have one, two or more levels. In particular, the linear drive comprises a hydraulic cylinder or a ball screw drive.

To achieve as large an angle as possible between the docking position and the presentation position, it is advantageous for the movement device to assume an extreme position or to be in a vicinity of an extreme position when the movement device is in the first position. This means that at least one linear drive is almost in its maximum length position. The maximum length position describes the position of the linear drive in which it is at its maximum length. Correspondingly, the minimum length position describes the position of the linear drive in which it is at its minimum length. The hub is the difference in length between the length when in the maximum length position and the length when in the minimum length position.

It is also beneficial if all actuators do not have to consume energy in the first position, so that they only have to be switched off if required for safety reasons, rather than having to bring the base element into a stable position, or having to stop or brake it, using external energy.

It is practical if the base element is in a stable position when in the docking position. This means that it does not leave the docking position unless supplied with energy. In this case, brakes are unnecessary.

A majority of the seats preferably have holding devices by means of which a person can be fixed relative to the seat. This may refer to a holding bracket; alternatively or additionally, the holding device may comprise seat belts. The holding device may be necessary to prevent people from falling out of the seats and injuring themselves.

According to a preferred embodiment, the projection screen is curved and the majority of seats is arranged within an imaginary fit sphere that goes through the projection surface. The fit sphere should be understood especially to mean the mathematically defined fit sphere, i.e. the sphere for which the integral of the deviations between the imaginary sphere and the projection sphere is minimal.

It is favourable if the seats can be automatically swivelled relative to the floor element. In other words, one swivel drive in particular is available by means of which the seats can be automatically swivelled. The advantage of this is that the swivel movements of the base element can be counterbalanced if necessary. It is possible but not necessary for each seat to have its own swivel drive. Rather, it is also possible for two or more seats to be driven by the same swivel drive.

According to a preferred embodiment, the motion picture presentation device has a control unit that designed to automatically carry out a method featuring the steps (i) identifying whether there is a release signal for moving the movement device for all seats occupied by a person, wherein said signal serves to provide a code for the situation in which the person occupying the seat is fixed relative to the seat, (ii) if there is a release signal, swivelling the swivelling arm such that the movement device moves into the presentation position, (iii) screening the motion picture and the synchronised movement of the viewers' seats, especially by moving a base element to which the seats are attached, by means of the movement device.

The control unit is preferably configured to automatically conduct a method featuring the additional steps of a swivelling of the swivelling arm such that the movement device moves into the docking position, and a release of the holding devices.

According to a preferred embodiment, the linear drive fixed to the swivelling arm forms a kinematic chain with swivelling arm. As a result, the linear drive always moves when the arm moves. Conversely, the at least two linear drives that are immovably fixed to a respective base point are independent of the arm. This means that a first movement of the arm does not necessarily cause a movement of the linear drive and a movement of the linear drive does not necessarily cause a movement of the arm.

Alternatively, the swing arm can also be designed in such a way that the base points of one, two or three linear drives are fixed to the swing arm, wherein the base points of the remaining linear drives cannot be moved by means of the swing arm; rather, they are fixed e.g. to a construction. In other words, parts of the hexapod drive can be moved by means of the swing arm.

The motion picture presentation device preferably has an access point, which enables viewers to reach the base element so they can reach the seats. In the docking position, the base element is docked at the access point.

Preferably, one of the linear drives, which is designated as a first linear drive, is fixed to the swivelling arm at a first arm-base point and to the base element at a first base element-base point, wherein the first base element-base point is higher up than the base points of at least four other linear drives when the base element is in the presentation position. This means that the linear drive has to absorb comparatively small forces and can be designed to be as light and simple as possible.

It is also beneficial if the movement device has a second linear drive, which is fixed to the swivelling arm at a second arm-base point and to the base element at a second base element-base point, wherein the second base element-base point is higher up than the base points of at least four other linear drives.

It is especially practical if the first linear drive, when in the presentation position, extends at a first angle of at most 30°, particularly at most 20° and/or at least 4° to the horizontal plane. Alternatively or additionally, the second linear drive, when in the presentation position, extends at a second angle of at most 30°, particularly at most 20° and/or at least 4° to the horizontal plane.

The third linear drive and the fourth linear drive preferably extend in the presentation position at a third or fourth angle, which preferably extend between 10° downwards and 20° upwards in relation to the horizontal.

The fifth linear drive and the sixth linear drive preferably extend in the presentation position at a fifth or sixth angle, which preferably extend between 40° and 60° to the horizontal.

It is practical if a designated fifth linear drive of the movement device, when in the presentation position, extends at a fifth angle of at least 40°, especially at least 45°, to the horizontal plane.

When in the presentation position, the linear drives are preferably extended between 50%±15% of the respective hub, wherein the arm is swivelled upwards.

Alternatively or additionally, it is practical if the movement device has a so-called sixth linear drive which, when in the presentation position, extends at a sixth angle of at least 40°, especially at least 45°, to the horizontal plane. The angles lie in a range between minus 90° to plus 90°. If the fifth angle is indeed the size given, this causes the fifth linear drive to absorb a large proportion of the weight force of the base element as well as of the seats and the viewers. Generally speaking, the greater the fifth angle, the smaller the force acting on the fifth linear drive. The same applies for the sixth angle and the sixth linear drive.

It is particularly beneficial if the fifth and the sixth linear drive are arranged in mirror symmetry to one another. Within the scope of the present invention, a mirror-symmetrical arrangement should be understood to mean a mirror-symmetrical arrangement in the technical sense. This means that it is possible, but not necessary, for the drives to be arranged mirror-symmetrically to one another in a strictly mathematical sense. Rather, it is sufficient if the linear drives are arranged in functional mirror symmetry to one another.

The swivelling arm preferably comprises a swivel drive. This may refer to a rotary drive, in particular an electric motor which is connected to the arm via a gearbox. Alternatively, it may refer to a linear drive that acts on the swivel arm.

It is beneficial if the swivelling arm can be locked in the presentation position. Specifically, in this case a locking device has been provided. The locking device should be understood to mean a device which prevents the swivelling arm from moving independently of the drive. If a locking device has been provided, the forces introduced into the drive are generally smaller, such that the drive can be configured to be weaker, which is practical.

All elements that move upon a movement of the base element out of the locking position into the presentation position have a joint mass centre of gravity. There is a centre of gravity function, which associates a height of the mass centre of gravity to a pre-determined swivel angle of the swivelling arm. The height is understood to mean the physical height, i.e. an increase in the height effects an increase in the potential energy.

It is beneficial if the centre of gravity function has a local minimum. It is especially beneficial if only onw local minimum exists. In this case, the base element is mounted to be bistable, wherein a global minimum of the potential energy of the elements that move during a movement of the base element is achieved when the base element is in the docking position; the other energy minimum is achieved when the base element is in the presentation position. This has the advantage that a comparatively small amount of potential energy is released during the movement out of the docking position into the presentation position. In turn, this renders it relatively easy to move the movement device out of the presentation position back into the docking position in the event of a failure of the drive, for example during a power cut.

The swivel angle at which the centre of gravity function has the local minimum is known as the maximum height swivel angle. The swivel angle at which the base element is in the docking position is known as the docking swivel angle. The swivel angle at which the base element is in the presentation position is known as the presentation swivel angle. It is practical if the maximum height swivel angle lies in the tercile between the docking swivel angle and the presentation swivel angle, which includes the presentation swivel angle.

When the base element is in the presentation position, the mass centre of gravity is at a presentation height. When the base element is in the docking position, the mass centre of gravity is at a docking height. It is beneficial for a sinking height difference between the height in the local maximum and the presentation height to be at most twice as large as an intermediate height difference between the height in the local maximum and the docking height. As a result, it is easier to move the base element out of the presentation position back into the docking position in the event of a power cut.

The motion picture presentation device preferably features a manually activated emergency drive. The emergency drive can preferably be used to move the base element into the docking position; in particular, to move it out of the presentation position into the docking position. The emergency drive may be, for instance, a crank device.

In the following, the invention will be explained in more detail by way of the attached figures. They show FIGS. 1A-1C: FIG. 1A depicts a motion picture presentation device with a projection surface, a projector, a multitude of seats for viewers, a base element and a movement device. FIG. 1B shows the base element in an intermediate position between the docking position and the presentation position. FIG. 1C, depicts the base element in its presentation position, in which the viewers can watch a presented motion picture.

Figure 2B:
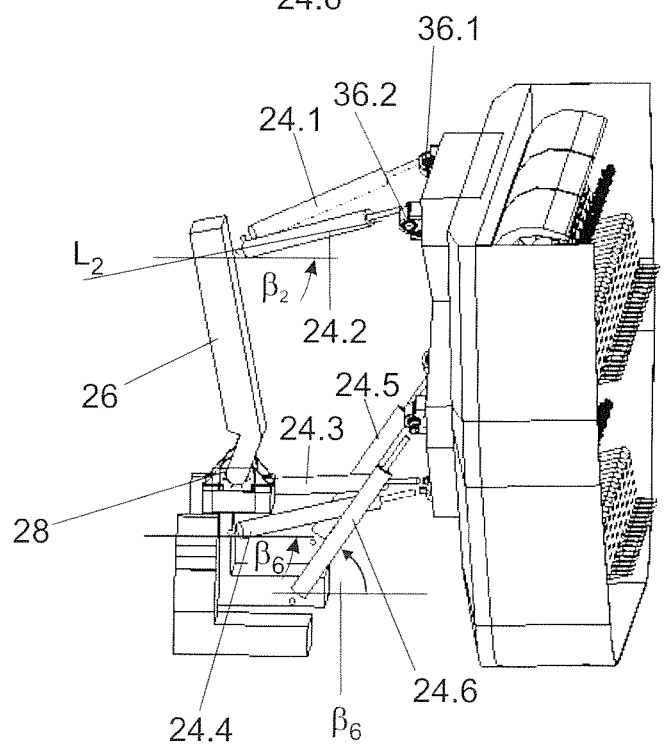

FIG. 2A: a perspective view of the movement device and the base elements in the docking position FIG. 2B: the movement device and the base element according to FIG. 2a in the presentation position.

Figure 3A:
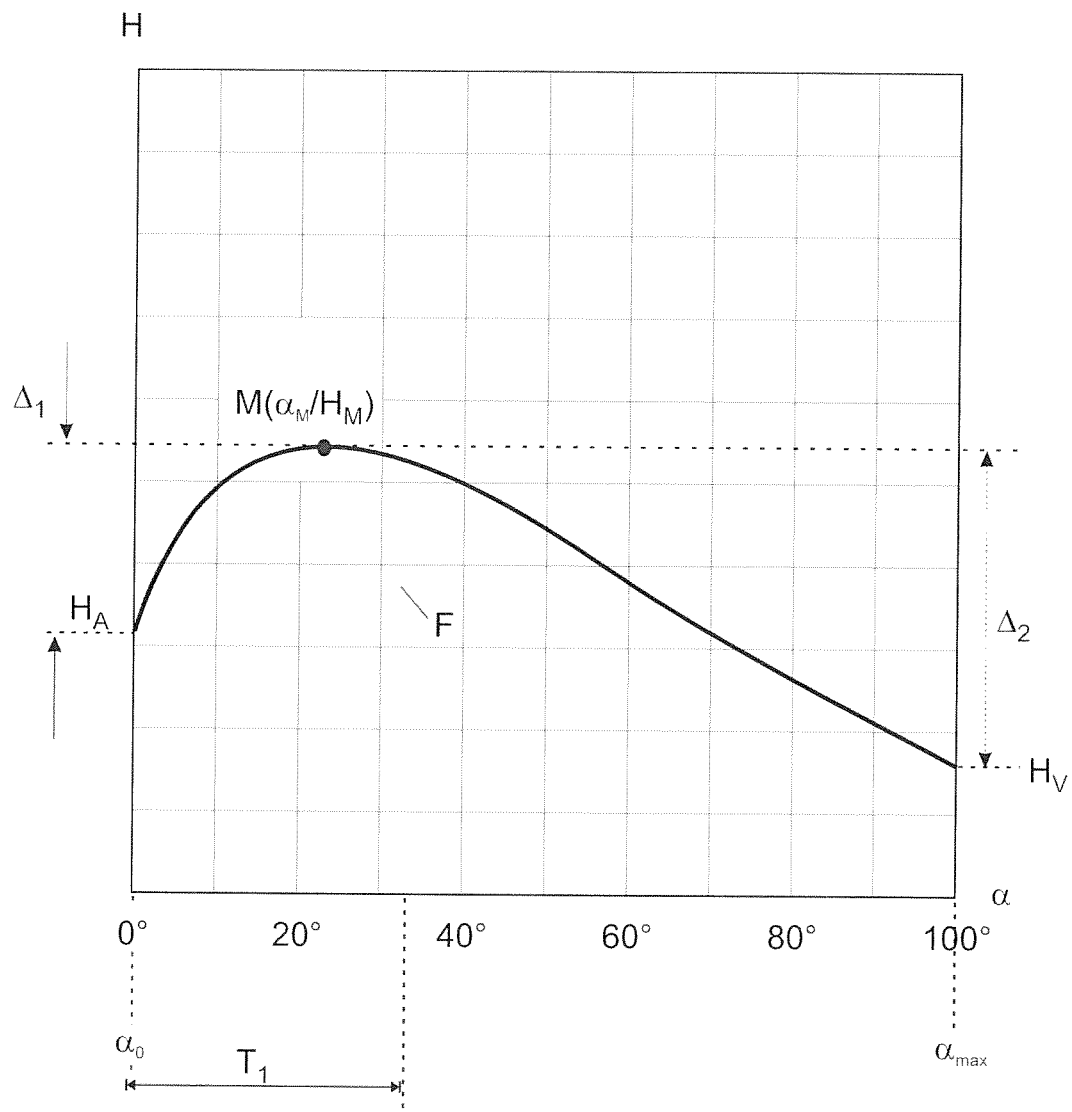
Figure 3B:
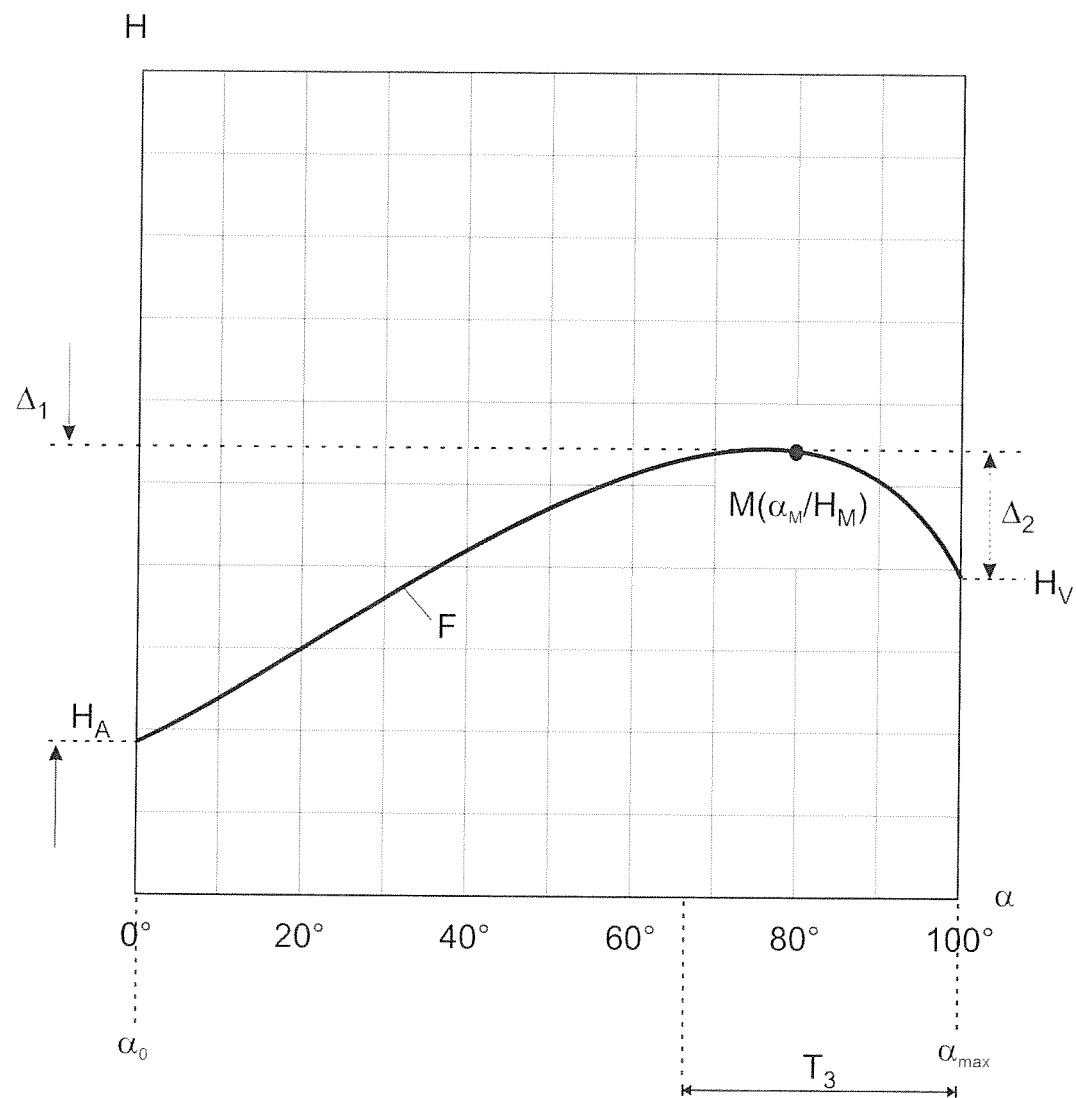
Figure 3C:
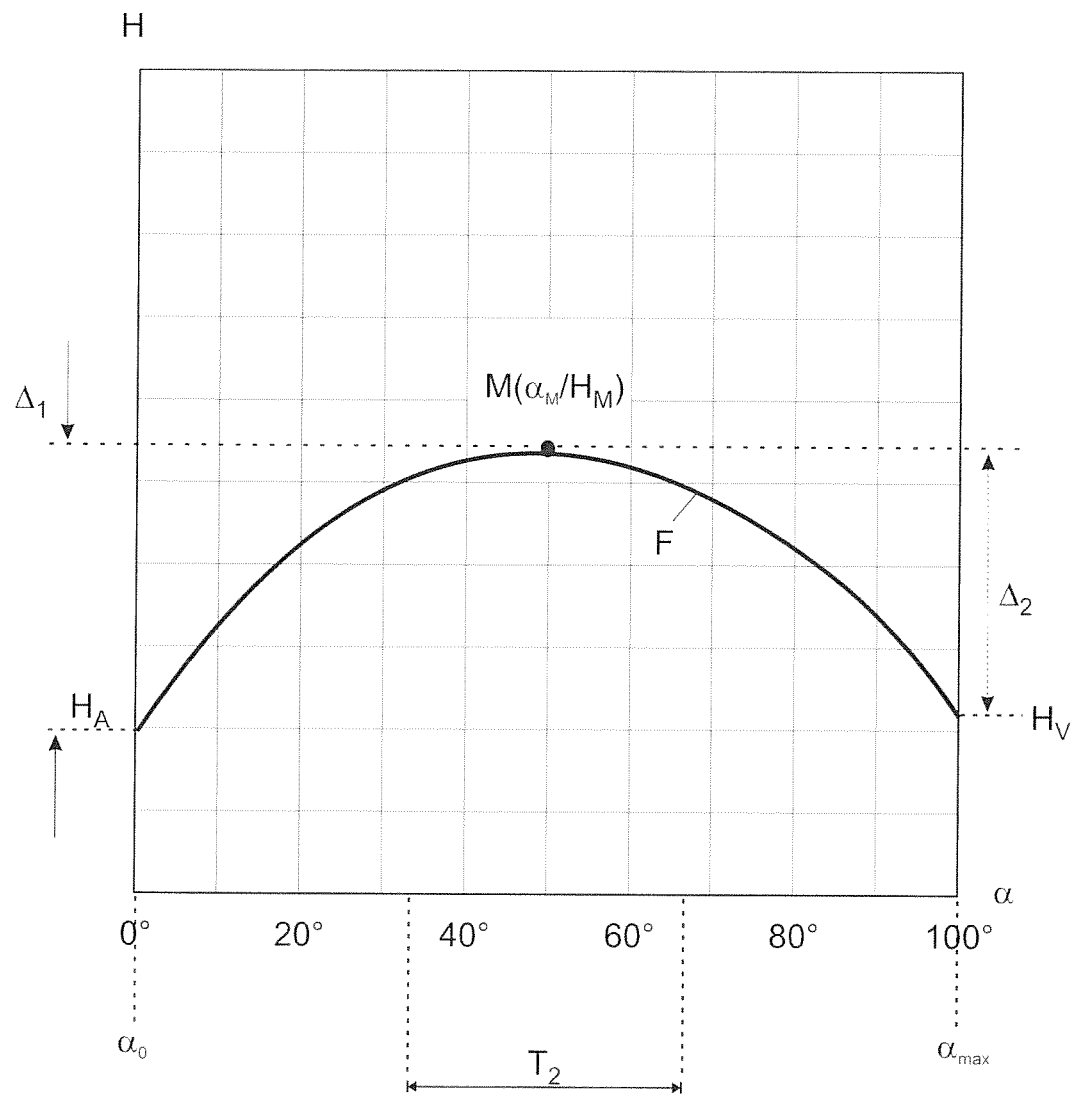

FIGS. 3A-3C: FIG. 3A shows a centre of gravity function F; FIG. 3B shows the centre of gravity function of a further embodiment of the invention where the local maximum lies in the presentation position-side tercile $T_3$; and FIG. 3C shows the centre of gravity function of a further embodiment of the invention where the local maximum lies in the central tercile $T_2$.

FIG. 1a depicts a motion picture presentation device 10 with a projection surface 12, a projector 14, a multitude of seats 16.1, 16.2, . . . for viewers 18.1, 18.2, . . . , a base element 20 and a movement device 22. The projector 14 is arranged to project a motion picture onto the projection surface 12. The seats 16.i (i=1, 2, . . . ) are rotatably mounted on the base element 20 about a respective rotational axis $D_{20}$. It is possible that a group of at least three and preferably at most 20 seats can be rotated about the respective same rotational axis D.

The movement device 22 comprises six linear drives 24.j, which together form a hexapod drive. In other words, the base element 20 can be moved in three translational degrees of freedom and three rotational degrees of freedom by activating the linear drive 24.j.

The movement device 22 features a swivelling arm 26, to which the linear drives 24.1, 24.2 (see FIG. 2b) are fixed. The arm 26 is fixed in a pivot bearing 28 on a foundation 30. It should be noted that the term "foundation" does not mean that there must be direct contact with the ground. For example, it is also possible that the foundation is formed by a part of a construction. The only decisive factor is that the foundation is stable enough to be able to bear the forces that occur during operation of the movement device 22.

FIG. 1a shows that the motion picture presentation device 10 may comprise an access point 32, by means of which the viewers 18.i can reach the seats 16.1. In FIG. 1a the base element 20 is shown in a docking position, in which it is docked at the access point 32. It is possible but not necessary for the base element 20 to be designed such that it forms a positive-locking connection with the access point 32. It is particularly practical if the movement device 22 is designed in such a way that the base element 20 pushes against the access point 32, even if an energy supply has failed.

This can be achieved, for instance, by ensuring that a mass centre of gravity S moves upwards when the base element 20 leaves its docking position. To calculate the mass centre of gravity, all elements are taken into account that move when the base element 20 moves out of the docking position into a presentation device, which is depicted in FIG. 1c, and whose movement contributes to a change in the potential energy.

FIG. 1c depicts the base element 20 in its presentation position, in which the viewers 18.i can watch a presented motion picture. It should be recognised that the arm 26 has been swivelled by a swivel angle α about an arm swivel axis $D_{26}$ by means of the pivot bearing 28. The swivel angle α is considered to be zero when the base element 20 is in its docking position shown in FIG. 1c. The swivel angle α is always measured positively.

FIG. 1b shows the base element 20 in an intermediate position between the docking position and the presentation position.

FIG. 2a depicts the movement device 22 and the base element 20 in the docking position. It should be recognised that the first linear drive 24.1 is fixed to the arm 26 at a first arm-base point 34.1 and to the base element 20 at a base element-base point 36.1. Correspondingly, each linear drive 24.j has an arm-base point 34.j and a base element-base point 36.j.

FIG. 2b shows that the first base element-base point 36.1 and the second base element-base point 36.2 lies above all other base element-base points when the base element 20 is in the presentation position.

Each linear drive has a longitudinal axis $L_j$, along which it is extended or shortened during operation. The angle between this longitudinal axis $L_j$ and a horizontal plane H is indicated by $\beta_j$. It should be noted that, for instance, the second angle $\beta_2$ is smaller than 20° when the base element 20 is in its presentation position. The same applies for the angles $\beta_1$, $\beta_3$ and $\beta_4$. Conversely, a sixth angle $\beta_6$, and a fifth angle $\beta_5$, not depicted here, is greater than 45°; in the present case $\beta_6=55°$.

In the present case, the arm 26 is driven by a schematically depicted swivel drive 38 in the form of a hydraulic cylinder. Alternatively, the swivel drive 38 may also comprise a screw thread electric motor.

FIG. 3a depicts a centre of gravity function F, which allocates the height H to the swivel angle α at which the mass centre of gravity S (see FIG. 1a) is situated at the respective swivel angle α. It should be noted that it passes through a local maximum M ($α_M/H_M$). The maximum swivel angle $α_M$ at which the centre of gravity function F passes through the local maximum lies in the docking position-side tercile $T_1$.

It should be recognised that the centre of gravity function F has two global minima at the swivel angle $α_0=0°$ (docking position) and the maximum swivel angle $α_{max}$ (presentation position). In the present case, $α_{max}=100°$; however, this value may be larger or smaller.

An docking height difference $\Delta_1 = H_M - H_A$ is the difference between the maximum height $H_M$ and the height $H_A = H(α_0)$ in the docking position. An presentation height difference $\Delta_2 = H_M - H_V$ is the difference between the maximum height $H_M$ and the presentation height $H_V = H(α_{max})$ in the presentation position. In the present case, the docking height $H_A$ is greater than the presentation height $H_V$, which represents a preferred embodiment regardless of other properties of the present embodiment.

FIG. 3b shows the centre of gravity function of a further embodiment of the invention; here, the local maximum lies in the presentation position-side tercile $T_3$. In this case, the docking height $H_A$ is smaller than the presentation height $H_V$, which represents a preferred embodiment regardless of other properties of the present embodiment. The advantage of this embodiment is that it is particularly easy to move the base element 20 into the docking position should the movement device fail. This is particularly true when the docking height difference $\Delta_1$—as shown in the present case—is greater than the presentation height difference $\Delta_2$; however, this is optional.

FIG. 3c shows the centre of gravity function of a further embodiment of the invention; here, the local maximum lies in the central tercile $T_2$. The presentation height difference $\Delta_2$ differs from the insertion height difference $\Delta_1$ by less than 15%, which represents an alternative preferable embodiment regardless of other properties of the present embodiment.

FIG. 1a depicts an emergency drive 40 in the form of a crank device which features a cable that is fixed to the free end of the arm 26. The cable is wound up on a drum, which is pre-tensioned in a winding device by way of a spring, so that the cable is permanently tensioned. In the event of a failure of the movement device 22, if the swivel angle α is greater than αM (see FIG. 3), the base element 20 can be moved back into its docking position by rotating the drum using a hand crank.

| Reference list: | |
|---|---|
| 10 | motion picture presentation device |
| 12 | projection surface |
| 14 | projector |
| 16 | seat |
| 18 | viewer |
| 20 | base element |
| 22 | movement device |
| 24 | linear drive |
| 26 | arm |
| 28 | pivot bearing |
| 30 | foundation |
| 32 | access point |
| 34 | arm-base point |
| 36 | base element-base point |
| 38 | swivel drive |
| 40 | emergency drive |
| α | swivel angle |
| $\beta_j$ | angle |
| $\Delta_1$ | insertion height difference |
| $\Delta_2$ | sinking height difference |
| $D_{20}$ | seat rotational axis |
| 26 | arm swivel axis |
| F | centre of gravity function |
| H | height |
| $H_A$ | docking height |
| $H_V$ | presentation height |
| i | number index |
| j | number index of the drives |
| L | longitudinal axis |
| M | local minimum |
| S | mass centre of gravity |
| $T_1$ | docking position-side tercile |
| $T_2$ | central tercile |
| $T_3$ | presentation position-side tercile |
| $\Delta_1$ | docking height difference |
| $\Delta_2$ | presentation height difference |

The invention claimed is:

1. A motion picture presentation device, comprising:
   (a) at least one display device,
   (b) a multitude of seats for viewers,
   (c) a movement device,
      which comprises at least five linear drives which collectively move the seats in at least five degrees of freedom,
      wherein at least one linear drive of the at least five linear drives is fixed to a swivelling arm, and
      wherein at least two linear drives of the at least five linear drives are immovably fixed at a respective base point, and
   (d) a base element,
      to which each of the seats are fixed such that they can be swivelled, and
      which is brought out of a docking position in which the base element is docked at an access point, into a presentation position in which the base element is swivelled by a swivel angle of at least 15° in relation to its docking position, by activating the movement device,
wherein
   the base element is brought from the docking position into the presentation position by swivelling the arm upwards.

2. The motion picture presentation device according to claim 1, wherein the at least one display device comprises
   (a) a projection surface and at least one projector which is configured to project a motion picture onto the projection surface, and/or
   (b) a curved light emitting diode (LED) screen.

3. The motion picture presentation device according to claim 1, further comprising:

(a) an access point by way of which viewers access the seats, (b) wherein the base element is docked at the access point when in the docking position.

4. The motion picture presentation device according to claim 1, wherein (a) the at least one linear drive that is fixed to the swivelling arm is fixed at a first arm-base point and is fixed to the base element at a first base element-base point, and (b) when the base element is in the presentation position, the first base element-base point is situated higher up than base points of at least four other linear drives.

5. The motion picture presentation device according to claim 1, wherein (a) a second linear drive of the at least five linear drives is fixed to the swivelling arm at a second arm-base point and to the base element at a second base element-base point, and (b) when the base element is in the presentation position, the second base element-base point is situated higher up than the base points of at least four other linear drives.

6. The motion picture presentation device according to claim 1 wherein (a) a first linear drive of the at least five linear drives extends in the presentation position at a first angle ($\beta_{j1}$) of at most 40° relative to a horizontal plane, and/or (b) a second linear drive of the at least five linear drives extends in the presentation position at a second angle ($\beta_2$) of at most 40° relative to a horizontal plane.

7. The motion picture presentation device according to claim 6, wherein (a) a third linear drive of the at least five linear drives, extends in the presentation position at a third angle ($\beta_3$) of at most 30° relative to a horizontal plane, and/or (b) a fourth linear drive of the at least five linear drives extends in the presentation position at a fourth angle ($\beta_4$) of at most 30° relative to a horizontal plane.

8. The motion picture presentation device according to claim 6, wherein (a) a fifth linear drive of the at least five linear drives extends in the presentation position at a fifth angle ($\beta_5$) of at most 40° relative to a horizontal plane, and/or (b) a sixth linear drive extends in the presentation position at a sixth angle ($\beta_6$) of at most 40° relative to a horizontal plane.

9. The motion picture presentation device according claim 1 wherein the swivelling arm comprises a swivel drive which is lockable in the presentation position.

10. The motion picture presentation device according to claim 1 wherein (a) the multitude of seats and the movement device collectively have a joint mass centre of gravity (S), and (b) a centre of gravity functionality, which associates a height of the joint mass centre of gravity to a swivel angle of the swivelling arm, has a local maximum.

11. The motion picture presentation device according to claim 10, wherein the maximum height swivel angle at which the centre of gravity functionality is at the local maximum lies in a central tercile between a docking swivel angle at which the swivelling arm extends when the base element is in the docking position, and a presentation swivel angle, at which the swivelling arm extends when the base element is in the presentation position.

12. The motion picture presentation device according to claim 10, wherein a sinking height difference ($\Delta_2$) between the local maximum and a presentation height of the mass centre of gravity (S) when the base element (20) is in the presentation position is at most twice as large as an entry height difference ($\Delta_1$) between the local maximum and a docking height of the mass centre of gravity (S) when the base element is in the docking position.

13. The motion picture presentation device according to claim 1 further comprising a manually activated emergency drive for bringing the base element into the docking position.

14. A viewer module for a motion picture presentation device, comprising:

a multitude of seats for viewers, a movement device, which comprises at least five linear drives which collectively move the seats in at least five degrees of freedom, wherein at least one linear drive of the at least five linear drives is fixed to a swivelling arm, and wherein at least two linear drives of the at least five linear drives are immovably fixed at a respective base point, and a base element, to which each of the seats are fixed such that they can be swivelled, and which is brought out of a docking position in which the base element is docked at an access point, into a presentation position in which the base element is swivelled by a swivel angle of at least 15° in relation to its docking position, by activating the movement device, wherein the base element is brought from the docking position into the presentation position by swivelling the arm upwards.

15. A method for presenting a motion picture by a motion picture presentation device which comprises at least one motion picture display device, and a viewer module according to claim 14, comprising activating the movement device by swivelling the arm upwards so that the base element is brought out of a first docking position, in which the base element is docked at the access point, into a presentation position, in which the base element is swivelled by a swivel angle ($\alpha$) of at least 15° in relation to its first position.

* * * * *